United States Patent [19]

Albrecht et al.

[11] Patent Number: 5,490,020

[45] Date of Patent: Feb. 6, 1996

[54] HIGH TORSIONAL STIFFNESS LOW AXIAL DEFLECTION STIFFNESS DRIVE SHAFT SYSTEM

[75] Inventors: Thomas R. Albrecht, San Jose; James H. Eaton, Morgan Hill, both of Calif.

[73] Assignee: International Business Machines Corporation, Armonk, N.Y.

[21] Appl. No.: 252,144

[22] Filed: Jun. 1, 1994

Related U.S. Application Data

[63] Continuation of Ser. No. 74,898, Jun. 10, 1993, abandoned.

[51] Int. Cl.[6] ................................................ G11B 15/32
[52] U.S. Cl. .......................................................... 360/96.3
[58] Field of Search ................................ 360/96.1, 96.3, 360/98.07, 99.08, 99.11; 464/93, 98, 99, 100, 101; 242/340, 342, 349, 352

[56] References Cited

U.S. PATENT DOCUMENTS

| | | | |
|---|---|---|---|
| 2,182,711 | 12/1939 | Thomas | 64/13 |
| 2,435,058 | 1/1948 | Thomas | 64/13 |
| 2,734,359 | 2/1956 | Mulheim et al. | 64/1 |
| 2,863,308 | 12/1958 | Flood | 64/10 |
| 3,050,225 | 8/1962 | Ulman | 226/51 |
| 3,135,949 | 6/1964 | Whyte | 360/99.08 |
| 3,589,636 | 6/1971 | Brown | 242/68.3 |
| 3,854,063 | 12/1974 | Bergman | 310/75 D |
| 3,865,331 | 2/1975 | Clever et al. | 242/199 |
| 3,883,090 | 5/1975 | Hall, Sr. | 242/199 |
| 3,987,645 | 10/1976 | Koster et al. | 464/98 |
| 4,000,866 | 1/1977 | Schulz | 242/203 |
| 4,096,711 | 6/1978 | Carlson et al. | 464/99 |
| 4,214,457 | 7/1980 | Wade et al. | 464/99 |
| 4,342,055 | 7/1982 | Osanai | 360/96.3 |
| 4,376,997 | 3/1983 | Eggers | 360/99.11 |

(List continued on next page.)

FOREIGN PATENT DOCUMENTS

| | | | |
|---|---|---|---|
| 456920 | 8/1944 | Belgium . | |
| 0173814 | 3/1986 | European Pat. Off. | 464/99 |
| 819181 | 3/1937 | France . | |
| 2200050 | 7/1973 | Germany . | |
| 2542946 | 3/1977 | Germany . | |
| 61-197822 | 9/1986 | Japan . | |
| 61-216152 | 9/1986 | Japan | 360/96.3 |

OTHER PUBLICATIONS

"Reversible Motor/Generator Reel-To-Reed Drive", W. D. Thorne and A. C. Thorpe, IBM Tech. Discl. Bulletin, vol. 20, No. 10, Mar. 1978, pp. 4048–4049.

Heinz P. Bloch, "Improve Safety and Reliability of Pumps and Drivers", *Hydrocarbon Processing* pp. 123–125, Feb. 1977.

VDI Berichte, vol. 299, 1977, Ehrlenspiel et al, pp. 160–169.

*Primary Examiner*—John H. Wolff
*Assistant Examiner*—David L. Ometz
*Attorney, Agent, or Firm*—Baker, Maxham, Jester & Meador

[57] ABSTRACT

A high torsional stiffness low axial deflection stiffness flexible drive shaft apparatus is provided for driving a magnetic tape cassette and includes a drive shaft having opposite ends, a device for engaging the magnetic tape cassette and a pair of flexible diaphragms. A device is connected to one of the drive shaft ends, one of the flexible diaphragms, and is connectable to a motor for transmitting torsional force from the motor to the drive shaft via the flexible diaphragm. Another device is connected to the other end of the drive shaft, the other flexible diaphragm and the tape cassette engaging device for transmitting torsional force from the drive shaft to the engaging device via the other flexible diaphragm. Because the diaphragms are too delicate to handle thrust loads and because the torsional stiffness of the diaphragm degrades rapidly as its center is displaced axially with respect to the outer driving points, a device is operably connected to each torsional force transmitting device for transmitting thrust loads exerted along the axes of rotation of the drive apparatus. With this arrangement the drive apparatus can easily adapt for misalignment of the drive apparatus with the magnetic tape cassette to deliver a reliable rotating force.

47 Claims, 7 Drawing Sheets

U.S. PATENT DOCUMENTS

| | | | |
|---|---|---|---|
| 4,411,634 | 10/1983 | Hammelmann | 464/99 |
| 4,421,496 | 12/1983 | Emerson et al. | 464/99 |
| 4,446,497 | 5/1984 | Hirayama | 360/109 |
| 4,485,416 | 11/1984 | Walters | 360/96.3 |
| 4,562,497 | 12/1985 | Morinaga et al. | 360/96.3 |
| 4,586,593 | 5/1986 | Danelson et al. | 192/67 R |
| 4,587,583 | 5/1986 | Tomita | 360/96.3 |
| 4,630,149 | 12/1986 | Ida | 360/96.3 |
| 4,675,756 | 6/1987 | Saitoh et al. | 360/71 |
| 4,707,751 | 11/1987 | Ozaki et al. | 360/99.08 |
| 4,737,136 | 4/1988 | Federn | 464/99 |
| 4,930,030 | 5/1990 | Yabu et al. | 360/107 |

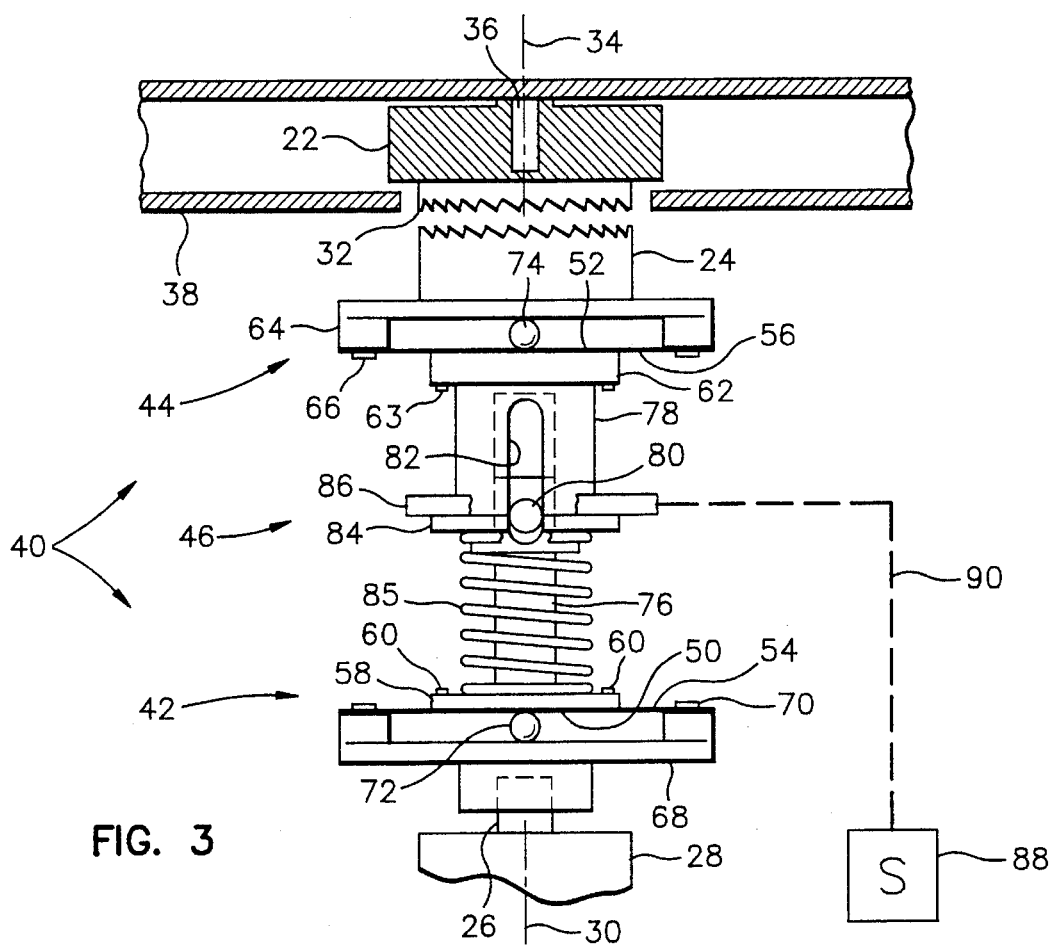
FIG. 3
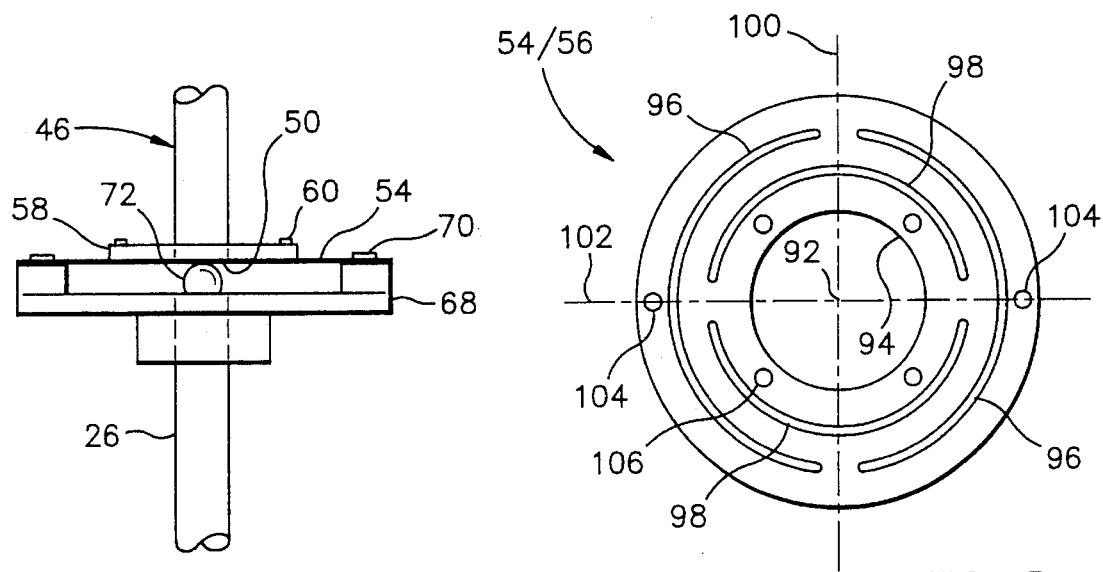
FIG. 4
FIG. 5

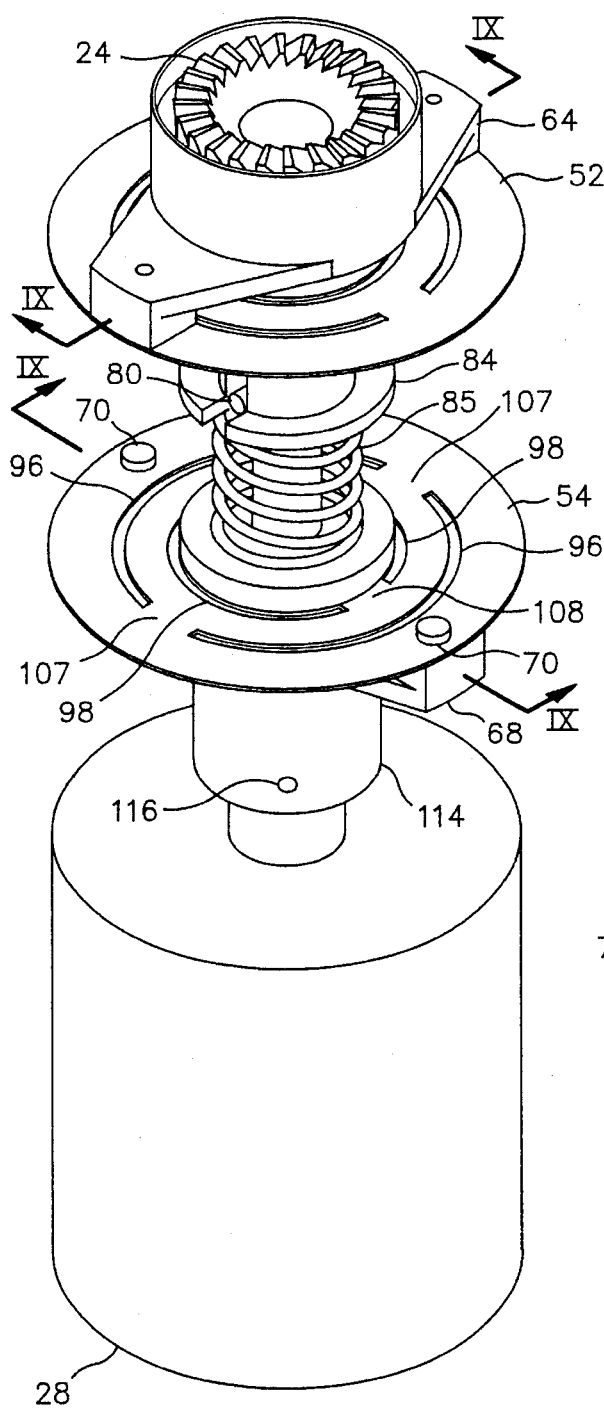
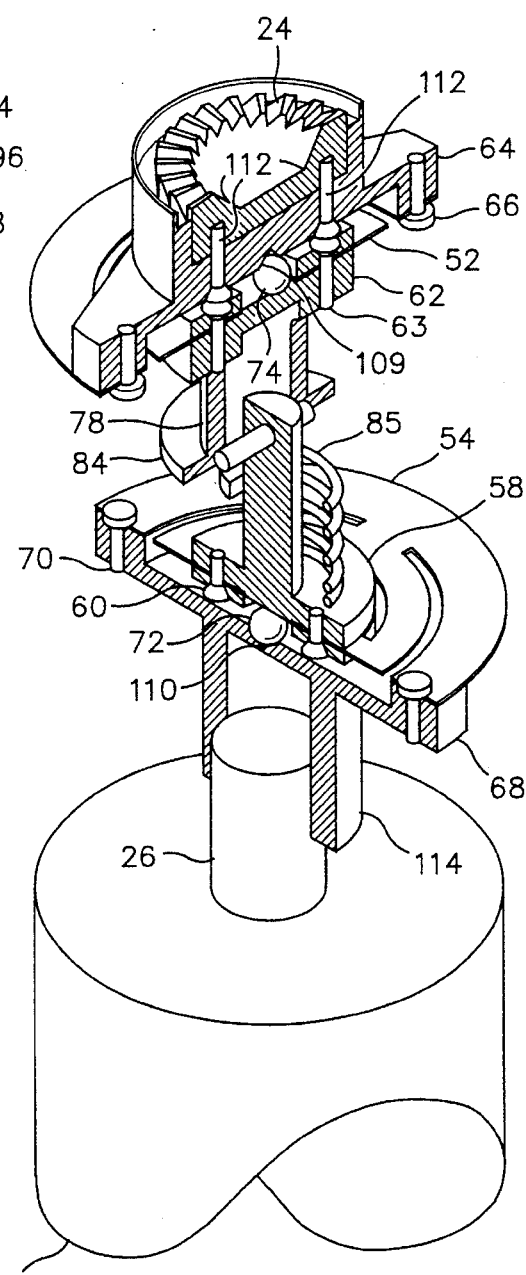
FIG. 8
FIG. 9

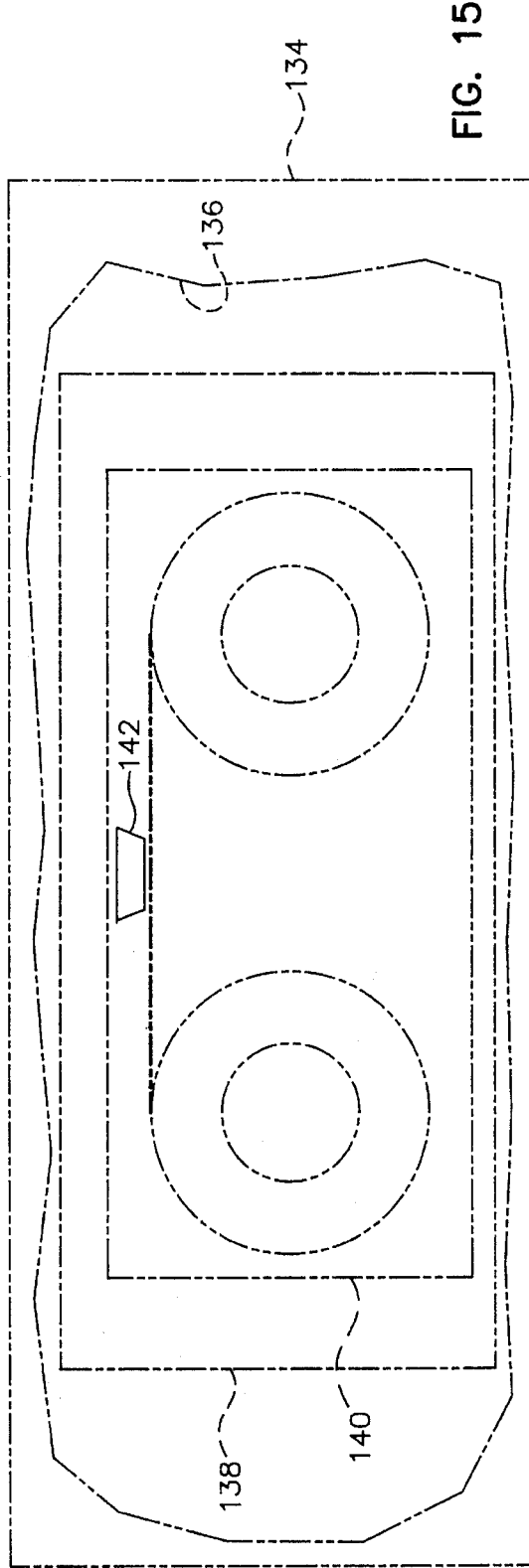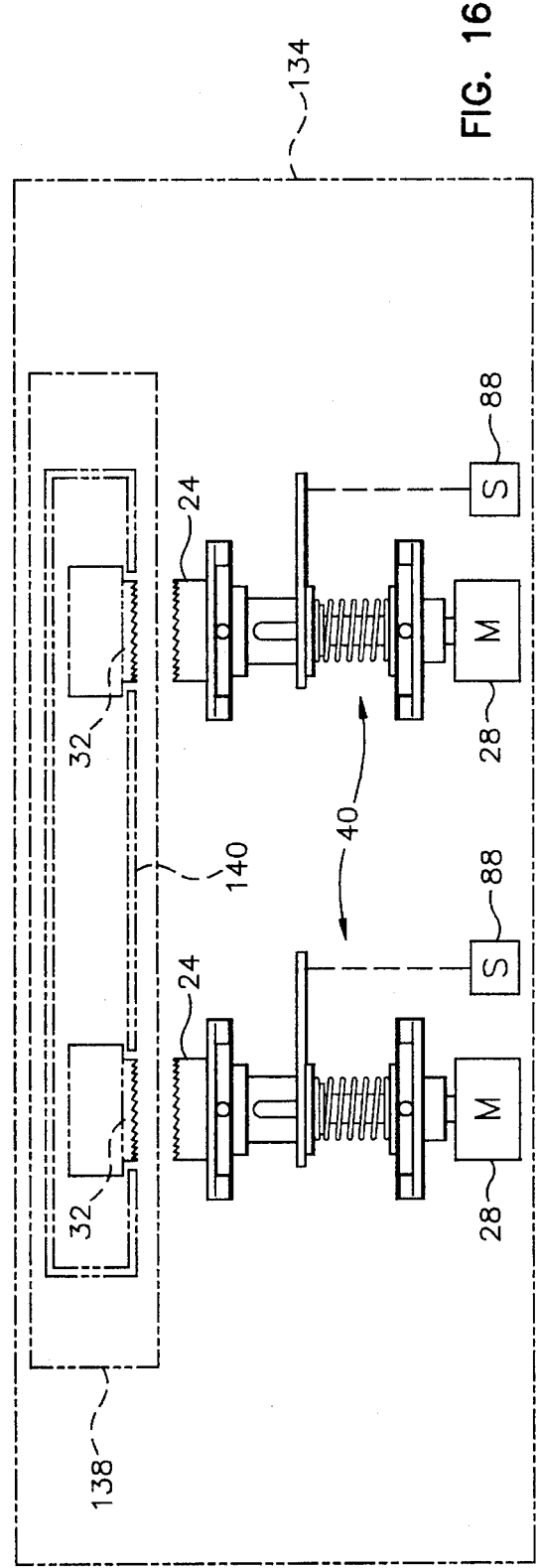

HIGH TORSIONAL STIFFNESS LOW AXIAL DEFLECTION STIFFNESS DRIVE SHAFT SYSTEM

This application is a continuation, of application Ser. No. 08/074,898, filed Jun. 10, 1993, now abandoned.

BACKGROUND OF THE INVENTION

1. Field of the Invention

The invention relates to a high torsional stiffness low axial deflection stiffness flexible drive shaft system for rotating recordable media, such as magnetic tapes or discs or video disks.

2. Discussion of the Related Art

There are at least three options for coupling a drive motor to one or more tape reels in a tape drive. The general problem of off-center drive exists in all cases, but is handled in different ways. The first option is a data cartridge which uses a belt drive. Although the belt inside the cartridge has more function than just solving the off-center drive problem, it is nevertheless one way to solve the problem. The second option, which is used in all audio and video cassette systems is to allow the tape reel to "float" inside the cartridge. The tape reels in such systems do not rotate on axes that are rigidly attached to the cartridge. The reels can move within a certain range to align with the drive axes. Usually the engagement method has some kind of self-centering device, such as spider gears, or the reel is allowed to wobble a little (audio and video tape cassettes). The third option is to have the tape reels rotate on axes that are rigidly connected to the cassette housing, and allow the drive shafts axes to adjust to the cassette reels. The advantage of this kind of system is that a precision tape path can be defined totally inside the cassette for excellent guiding, low debris generation, etc. Note that the first option also has the tape path totally defined inside the cassette.

In the third option, each reel includes an axle with a bearing that is designed to have a close fit; however the axle will rock slightly if the tape driving mechanism ("tape drive") is not aligned with it. This rocking motion results in an unreliable tape path which, in turn, causes low quality recording or playing of the magnetic tape.

Some magnetic tape cassettes have a gear connected to each reel axle. In a like manner, the tape drive has a pair of drive gears, each drive gear being engageable with a respective reel axle gear to implement the tape driving function. In addition to low quality tape performance, misalignment between the drive system and the reel axles further results in improper meshing of the gears. This improper meshing causes wear of the gears and creates debris which can adversely affect system performance.

The off-center drive problem is a classic mechanical problem, with numerous solutions existing in the prior art. For example, automobile drive trains often use a pair of universal joints and a telescoping joint to solve the problem. Farm implements and other heavy machinery commonly use elastic joints to accommodate offsets. Precision equipment often employ bellows couplings, Oldham couplings, and spider couplings. None of these prior art teachings solves the cassette offset drive problem. A tape drive for a magnetic tape cassette must have high torsional stiffness and low axial deflection stiffness, and yet must be capable of supporting a thrust load. The high torsional stiffness is required to rotate the cassette reel and the low axial deflection stiffness is required to prevent the exertion of tipping torque on the reel axle. Tipping torque that is too large is what causes the reel to rock back and forth. The difficult problem is in providing low axial deflection stiffness and at the same time supporting the necessary thrust load to make driving engagement. The tape drive must also deliver a constant velocity with low drag. This is necessary in order to obtain a reliable tape path for recording or playing the magnetic media. Further, exacting engagement between the tape drive and each cassette drive axis is necessary to minimize gear wear and debris generation.

Many of the aforementioned problems associated with magnetic tape drives also apply to magnetic or video disk drives. These drives receive magnetic or optical disks. Such disks normally have a central aperture which engages a drive system grabette, the grabette being powered for rotating the disk. Alignment between the disk drive and the central axis of a disk is necessary to prevent any rocking motion which will impact on any play or record path.

SUMMARY OF THE INVENTION

The present invention overcomes the aforementioned problems associated with prior art recordable media drives by providing a flexible drive shaft apparatus which will reliably rotate the recordable media for a transport function (such as search or wind/rewind) and a play or record operation even though there is an axis misalignment between the drive shaft and the recordable media reel. The problem is especially troublesome with a magnetic tape cassette which has a pair of reels mounted on axles which are fixed to the cassette housing. The present invention overcomes the offset problem between a tape drive and cassette reel axles by providing a unique combination of elements. The combination includes a drive shaft which has opposite drive ends along an axis of rotation, an engaging device, such as a gear, which has an axis of rotation, and a pair of flexible diaphragms. An important feature of the invention is how these various elements are connected together which leads to important connecting devices of the invention. One set of components is connected to one of the ends of the drive shaft, to a first one of the flexible diaphragms and is further connectable to a rotational power source, such as a motor. The feature of this set of connecting components is that it transmits torsional force from the motor to the drive shaft via the flexible diaphragm. Another set of components is connected to the other end of the drive shaft, a second one of the flexible diaphragms and the engaging device, such as the aforementioned gear. This set of components transmits torsional force from the drive shaft to the engaging device via the other flexible diaphragm. At this point it can be seen that the flexible diaphragms are important elements of the invention because each, on its own, transmits the torsional force necessary to drive the recordable media. The invention uniquely configures these flexible diaphragms so that they will deflect easily for axis offset and yet have high torsional stiffness transmitting torque to rotate the recordable media. The torsional stiffness degrades rapidly as the center of the diaphragm moves out of the plane of the outer attachment points. In order to overcome this problem the invention uniquely provides a device associated with each diaphragm for transmitting axial thrust loads and maintaining the center of the diaphragm in the plane of the outer attachment points.

An object of the present invention is to provide a flexible drive shaft system which can easily and reliably deflect to adapt for misalignment or axes offset between the drive system and the article to be driven.

Another object is to provide a high torsional stiffness low axial deflection stiffness flexible drive shaft system for reliably rotating recordable media.

A further object is to provide a high torsional stiffness low axial deflection stiffness flexible drive shaft apparatus which will reliably drive magnetic tape cassette reels even though the axes of the tape drive and any reel axis may be offset.

Still another object is to provide a reliable system for playing and/or recording recordable media.

Still a further object is to provide a unique flexible diaphragm which may be used for a flexible drive system.

These and other objects will be better understood from the following detailed description, taken together with the below described drawings.

BRIEF DESCRIPTION OF THE DRAWINGS

FIG. 3 is a schematic illustration of an embodiment of the present invention.

FIG. 4 is a schematic illustration of one of the flexible joints of the drive apparatus.

FIG. 5 is a planar view illustrating the details of one of the flexible diaphragms used for the joint of the drive apparatus.

FIG. 8 is a isometric view of the flexible shaft drive apparatus.

FIG. 9 is an isometric view of the flexible shaft drive apparatus with portions cut away generally along planes IX of FIG. 8 to show various details thereof.

FIG. 15 is a schematic illustration of a tape drive system which has a tape cassette receptacle, a pair of the drive shaft apparatuses and devices for extending and retracting the drive shaft apparatuses with respect to the reel axles.

FIG. 16 is a schematic illustration of the top of FIG. 13.

DETAILED DESCRIPTION OF THE PREFERRED EMBODIMENTS

The following figures show the invention as applied to a magnetic tape device in which information is typically written to and read from a tape by known magnetic or optical procedures. Such tapes are spooled on individual reels and in single or dual reel-type tape containers which are known as "cassettes" or "cartridges". The tape path defined for any type of tape by a cartridge and a tape drive includes a tape head in close proximity to the tape and having one or more transducer elements for writing to and/or reading from the tape. The tape is driven past the tape head by rotation of the reel or reels in a tape container.

Figure 1:
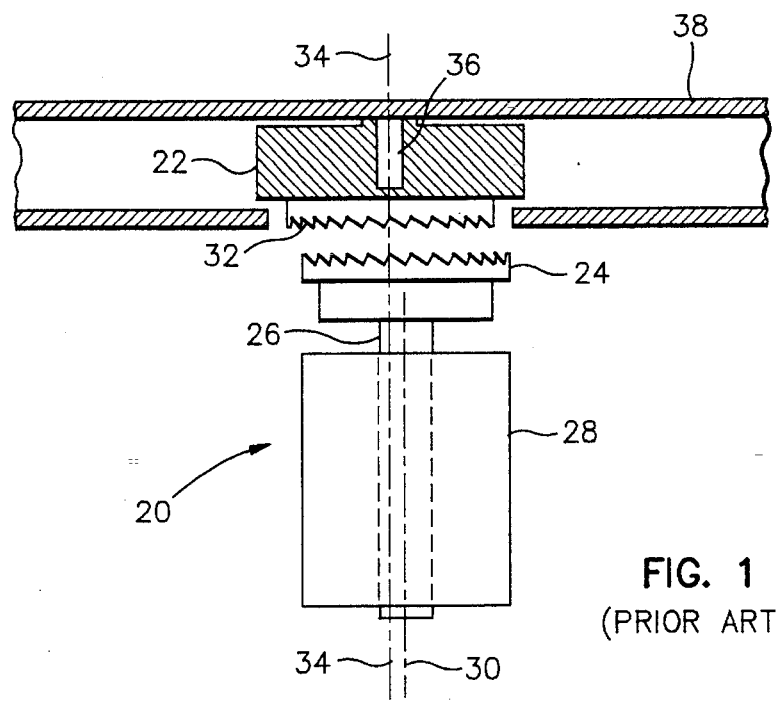
FIG. 1 is a schematic illustration which provides background information.

Referring now to the drawings wherein like reference numerals designate like or similar parts throughout the several views there is illustrated in FIG. 1 an apparatus 20 for driving a tape reel 22. The tape drive apparatus 20 includes a spider gear 24 which is connected to an output shaft 26 of a motor 28. The output shaft 26 has an axis of rotation 30. The tape reel includes a spider gear 32, and is mounted for rotation about an axis 34 by an axle 36 which is connected to a cassette housing 38. As can be seen from FIG. 1, the motor shaft axis 30 and the reel axis 34 are misaligned. This will cause the spider gears 24 and 32 to improperly mesh. The result is rocking of the tape reel 22 on its axis 34 and wear between the gears. This is unacceptable for high performance systems.

Figure 2:
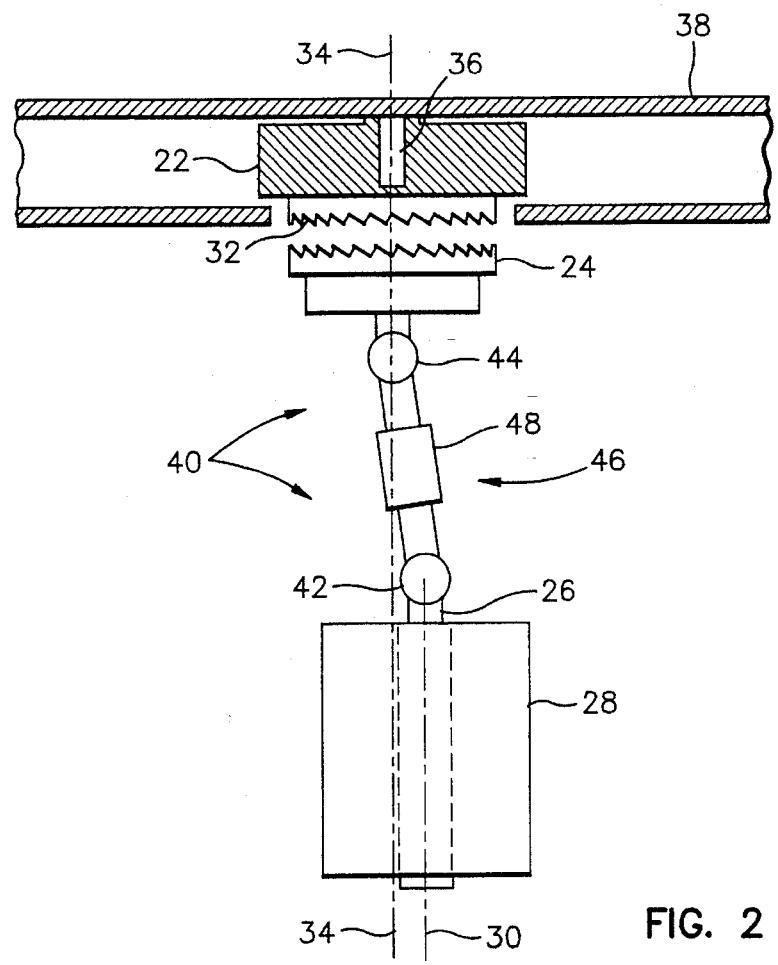
FIG. 2 is a schematic illustration explaining the principle of the present invention to overcome the off-center problem between the drive apparatus and the reel axle.

FIG. 2 illustrates the principle of the invention for aligning the drive shaft apparatus when there is a lateral offset between the motor axis 30 and the reel axis 34. This is accomplished by providing a flexible drive assembly 40 which interconnects the motor shaft 26 to the spider gear driver 24. The drive assembly 40 includes a pair of flexible joints 42 and 44 which interconnect one end of a drive shaft assembly 46 to the motor shaft 26 and the other end of the drive shaft assembly 46 to the spider gear 24. The drive shaft 46 may also be provided with a telescoping joint 48. Because of the flexing of the joints 42 and 44, the drive assembly 40 will now align to the reel axis 34 even though the reel axis 34 is offset from the motor shaft axis 30.

FIG. 3 is another schematic illustration showing further details of the present invention. As shown, the flexible drive assembly 40 includes a drive shaft assembly 46 which has opposite driving ends 50 and 52. A pair of flexible diaphragms 54 and 56 may be provided, each diaphragm having oppositely facing substantially flat sides which will be illustrated in more detail hereinafter. The diaphragms are flat when they are not flexed. The invention provides for connecting each diaphragm 54 and 56 to a respective shaft end 50 and 52 with a flat side of each diaphragm extending in a respective lateral plane, each respective lateral plane being substantially perpendicular to the axis of rotation 30 of the drive shaft 26. A mechanism for connecting the bottom shaft end 50 to the diaphragm 54 includes a hub 58 which is bolted to the diaphragm by bolts schematically illustrated at 60. The mechanism for connecting the other shaft end 52 to the diaphragm 56 includes a hub 62 which is bolted to the diaphragm 56 by bolts schematically illustrated at 63.

The spider gear 24 of the flexible drive shaft apparatus engages the reel spider gear 32 of the magnetic tape reel 22. The invention provides for connecting the spider gear 24 to the flexible diaphragm 56 in a position opposite the drive shaft end 52. This connection includes a yoke 64 which has its outer ends connected to the flexible diaphragm 56 at outer positions by any suitable means such as the bolts schematically illustrated at 66. The yoke 64 will be described in more detail hereinafter. Power means for the drive apparatus 40 is provided by a motor 28 with an output element, which may be the motor shaft 26. The invention provides for connecting the motor shaft 26 to the other flexible diaphragm 54. This connection includes another yoke 68, identical to the yoke 64, which has outer ends fixed to the flexible diaphragm 54 at outer locations by any suitable means such as the bolts schematically illustrated at 70.

It should be noted that the combined connections of the hub 58 and yoke 68 to the flexible diaphragm 54 provide for transmitting torsional force from the motor 28 to the drive shaft assembly 46 via the flexible diaphragm 54. In a similar manner, the combined connections of the hub 62 and the yoke 64 to the flexible diaphragm 56 provide for transmitting torsional force from the drive shaft assembly 46 to the spider gear 24 via the flexible diaphragm 56. The diaphragms 54 and 56 are, by design, very thin and will be described in more detail hereinafter. The thinness of their construction allows for the desired flexure to adapt for misalignment of the axes 30 and 34. However, because of this thin construction, the flexible diaphragms are especially vulnerable to axial forces exerted along the axes of rotation of the motor shaft 26, the drive shaft assembly 46 and the spider gear 24 (see FIG. 2). In order to overcome this problem, each of the flexible joints 42 and 44 has provision for transmitting thrust loads exerted along all of the aforementioned axes of rotation. Preferably, thrust loads are transmitted by a pair of spherical balls or ball portions 72 and 74, a flattened portion of each ball being centrally connected within respective yokes 68 and 64 by any suitable means, such as a epoxy bonding. A rounded portion of each ball 72 and 74 engages respective shaft ends 50 and 52 via hubs 58 and 62 to transmit axial loads from the motor shaft 26 to the drive shaft assembly 46 and then from the drive shaft assembly 46 to the combined yoke and spider gear 64 and 24. With this arrangement, axial stress is relieved on each of the flexible diaphragms 54 and 56.

FIG. 3 also schematically illustrates an exemplary drive shaft assembly 46 which telescopes for expanding or lengthening the distance between its ends 50 and 52. The telescoping is provided by a rod 76 which slidably reciprocates within a hollow cylinder 78, the rod 76 being fixed to the hub 58 and the hollow cylinder 78 being fixed to the hub 62. The rod 76 has a laterally extending pin 80 which rides in a slot 82 in the hollow cylinder 78. The hollow cylinder 78 may be provided with an annular outwardly extending collar 84. A compression spring 85 may be located between the flange 84 and the hub 58 for urging the drive shaft spider gear 24 into engagement with the reel spider gear 22. With the telescopic arrangement the flexible drive assembly 40 can apply the necessary thrust to make proper driving engagement between the spider gears 24 and 32. In order to disengage and withdraw the spider gear 24 from the reel spider gear 32 a retracting assembly may be operably connected to the telescoping drive shaft assembly 46 for selectively overcoming the compression spring and pushing the spider gear 24 toward the motor 28. This retracting assembly includes a yoke 86 which fits around the hollow cylinder 78 above the collar 84. The yoke 86 is connected to a longitudinal solenoid 88 by a shaft 90. When the longitudinal solenoid 88 is actuated, the yoke 86 is moved downwardly to bear on the collar 84 and thereby withdraw the spider gear 24 from the spider gear 32.

FIG. 4 is a simplified schematic illustration of one of the flexible joints showing the motor shaft 26 connected to the yoke 68, which in turn is connected to the diaphragm 54, which in turn is connected to the drive shaft assembly 46. It can be seen from this illustration how misalignment of the axes of shafts 26 and 46 will be absorbed entirely by the deflection of the flexible diaphragm 54. FIG. 3 also illustrates how damaging axial loads along these shafts could be to the diaphragm. This is overcome by the ball portion 72 which is fixed to the center of the yoke 68 for rolling action on the bottom end 50 of the drive shaft assembly 46. This rolling action is actually on the hub 58 which forms the end 50 of the drive shaft assembly 46. It is important that the spherical portion of the ball 72 engage the shaft end 50 in a plane which is substantially coplanar with a mid-plane between the two flat sides of the flexible diaphragm 54. This arrangement is illustrated in FIG. 4, the diaphragm 54 being represented by a thick line. With this arrangement there is only rolling action between the ball 72 and the shaft end 50 even though the flexible diaphragm 54 is deflected due to axis misalignment between the shafts 26 and 46. If this plane occurs above or below the flexible diaphragm 54 there will be an undesirable rubbing action between the ball portion 72 and the shaft end 50 resulting in wear and debris. The same arrangement is applicable to the other ball 74 and shaft end 52 with respect to the flexible diaphragm 56 (see FIG. 3).

A top view of one of the flexible diaphragms 54 or 56 is illustrated in FIG. 5. For description purposes the reference numeral 54 will be used, however, the description applies to both flexible diaphragms. As shown in FIG. 5, the diaphragm 54 is a substantially flat generally circular element with a central axis 92. The flexible diaphragm element 54 has a central aperture 94 with respect to the central axis 92 so that the ball portion 72 (see FIG. 4) makes direct engagement with the shaft end 50. The diaphragm element 54 has at least two pairs of arcuate apertures 96 and 98 about the central aperture 94, the arcuate length of the apertures in each pair being substantially equal. The apertures 98 of one pair extend along an inner circle and the apertures 96 of the other pair extend along an outer circle. The circles of both pairs are concentric with respect to each other about the central axis 92. The apertures in each pair are also symmetrical about the central axis 92 so as to define respective axes of symmetry 100 and 102 which equally bisect the arcuate length of the apertures of the respective pair of apertures. As shown in FIG. 5, these axes of symmetry 100 and 102 are offset 90 degrees from one another about the central axis 92. The diaphragm element 54 may further include a pair of mounting apertures 104 which are located outside the outer pair of apertures 96 in diametrically opposite directions from the central axis 92 along the symmetrical axis 102 of the outer pair of apertures 96. The diaphragm element may further include a plurality of mounting apertures 106 between the central aperture 94 and the inner circle aperture pair 98. Mounting apertures 104 may be for the passage of bolts 70 and 66 and the mounting apertures 106 may be for the passage of the bolts 60 and 63. It has been found that a diaphragm element constructed of stainless steel with a thickness between 0.002 to 0.010 inches provides optimum torsional and deflection performance. It should be understood that in some embodiments the diaphragms 54 and 56 and the apertures therein may be noncircular.

Figure 6:
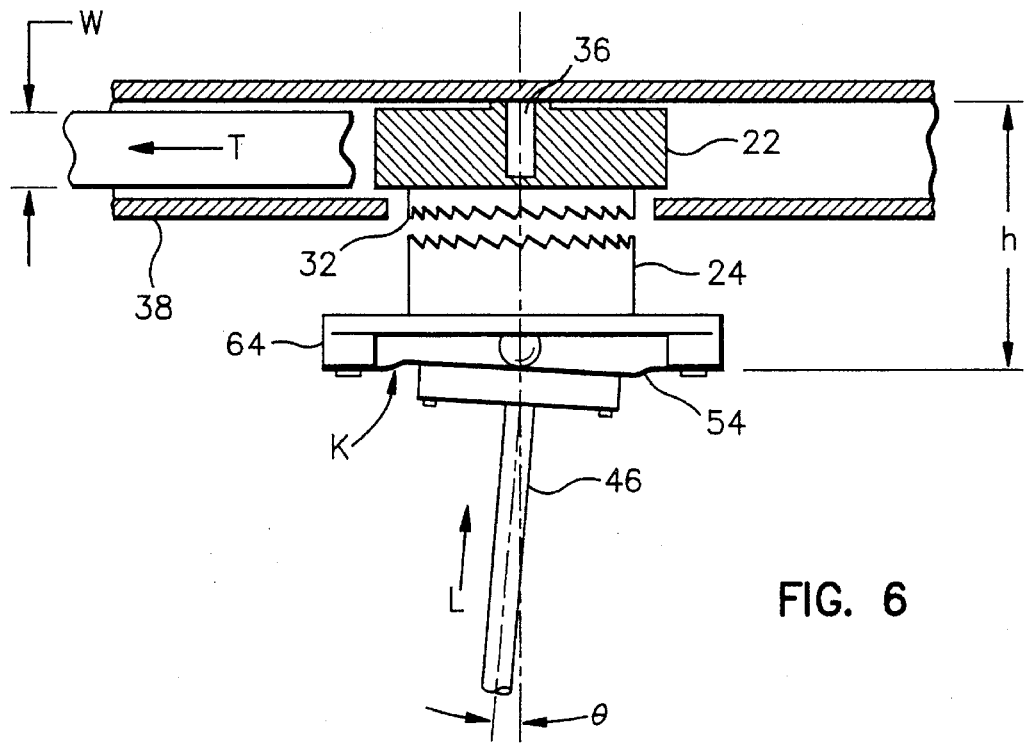
FIG. 6 is a schematic illustration of the drive apparatus engaging a magnetic tape reel for explaining the design parameters of the flexible diaphragm.

FIG. 6 illustrates exemplary design criteria for establishing the optimum thickness of a stainless steel flexible diaphragm 54 given certain parameters. The flexible joints 42 and 44 are torsionally stiff for transmitting rotational torque to the reels. They provide high torque, maintain good tension control, and eliminate torsional vibrations which would adversely affect tape speed and tension servo. The second kind of torque is a "reel tipping" torque, which is in a different direction. This tipping torque must be kept low so that the reels stay in a well defined unique position, and do not rock on their axles during use. This tipping torque is minimized by having the couplings deflect easily to accommodate axis offset. Also the total axial (thrust) load and the amount of offset affect the tipping torque. The net tipping torque on the reel has three components, namely: 1) the torque due to the tape tension which is $$N_{ten} = \frac{Tw}{2}$$

where T=tape tension and w=tape width; 2) the torque due to the off axis thrust load which is $N_{thr}=Lh\sin\theta$ where L=thrust load, h=pivot height and θ= deflection angle; and 3) torque due to the bending of the flexible diaphragm which is $N_{fix}=K\theta$ where K=deflection torque constant of the flexible diaphragm and θ=the deflection angle. The condition for stability is $N_{ten}>N_{thr}+N_{fix}$. Typical values for a magnetic tape reel cassette are maximum thrust load L of two newtons, a maximum deflection angle θ of 1.6°, a tape width w of 8 mm, a maximum tape tension t of 2.5 oz and a pivot height h of 15 mm. It can be seen that the condition of stability is that the torque due to tape tension always dominates so as to bias the reel 22 into a constant position with respect to the axle 36. With the above parameters the torque due to tape tension is approximately 0.003 N-m and the maximum torque due to off axis load is 0.0008 N-m. For a 20 mm diameter flexible diaphragm the following deflection constants have been obtained, namely: 1) 0.0001 N-m/deg for 0.003 inch thick high strength stainless steel and 2) 0.0008 for 0.005 inch thick high strength stainless steel. Allowing 1.6° of deflection in any direction it is clear that either of these two thin stainless flexible diaphragms are adequate to prevent reel tipping. The optimum for these conditions is to use 0.005 inch material since durability and rotational stiffness are maximized without allowing reel tipping.

Figure 7:
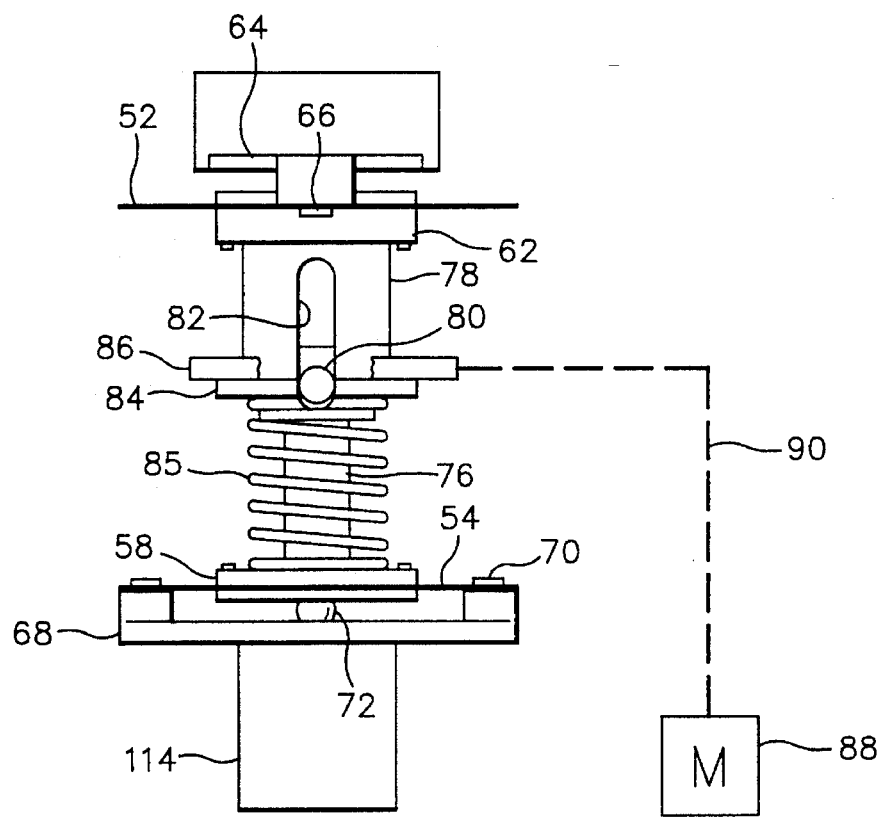
FIG. 7 is a side view of the flexible shaft drive apparatus.

Additional details of the invention are illustrated in FIGS. 7, 8 and 9. As shown in FIG. 8, it is desirable that the bolts 70 fix the flexible diaphragm 54 to the yoke 68 along the axis of symmetry 102 (see FIG. 5) which bisects the outer ring of apertures 96. With this arrangement, flexure of the diaphragm 54 is optimized with resistance to flexure being solid portions 107 of the diaphragm between the apertures 96 when the deflection is about the axis of symmetry 100 (see FIG. 5) of the apertures 98. When the deflection is about the axis of symmetry 102 (see FIG. 5) of the apertures 96, the torsional force is transferred from the solid portions 107 between the apertures 96 to solid portions 108 between the apertures 98, again resulting in good deflection characteristics. Because of the solid portions 107 and 108 between the pairs of apertures 96 and 98 good driving force can be achieved even though the flexible diaphragm has been deflected. The same holds true for the flexible diaphragm 52. As shown in FIG. 9, the balls 72 and 74 may be whole instead of partial and may be fixed within respective collar recesses 109 and 110 by any simple means such as epoxy bonding. Also, as shown in FIG. 9, the spider gear 24 may be fixed to the collar 64 by bolts 112. As shown in FIGS. 8 and 9, the output shaft 26 of the motor may be fixed to the yoke 68 by a sleeve 114 and a setscrew or pin 116. FIG. 7 shows the yoke 86 engaging the collar 84, and operable by the solenoid 88 to overcome the spring 85 and retract the spider gear 24 when desired. FIGS. 8 and 9 clearly show that the yoke 68 holds only a small portion of the outer annular ring of the diaphragm 54 rigid while the hub 58 holds the entire inner annulus of the diaphragm rigid. The same arrangement also applies to the other diaphragm 52.

Figure 10:
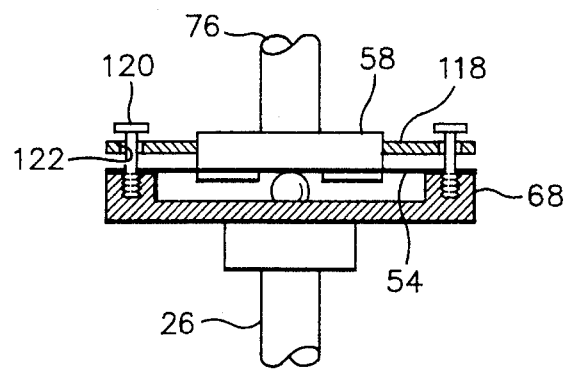
FIG. 10 is a schematic illustration showing one type of stops for limiting the angle of deflection of the flexible diaphragm.
Figure 11:
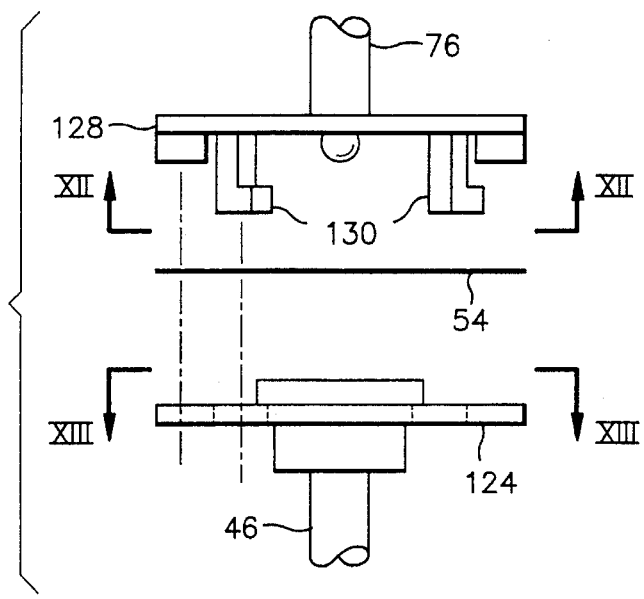
FIG. 11 is an exploded schematic illustration showing another type of stop for limiting the angle of deflection of the flexible diaphragm.
Figure 12:
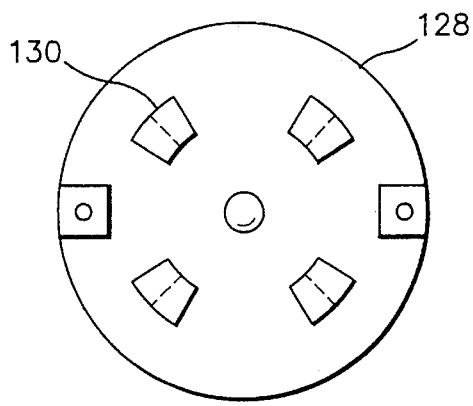
FIG. 12 is a view taken along plane XII—XII of FIG. 11.
Figure 13:
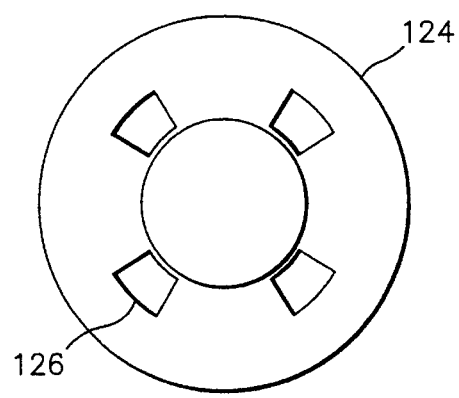
FIG. 13 is a view taken along plane XIII—XIII of FIG. 11.

FIGS. 10 and 11 schematically illustrate a stopping mechanism for each of the flexible joints 42 and 44 (see FIG. 3) for limiting the angles of deflection between the flexible diaphragms 54 and 56 and the drive shaft means 46. As shown in FIG. 10, the stopping mechanism includes a plate 118, which is rigidly fixed in a lateral position to the hub 58, and bolts 120 which extend through plate apertures 122 and are threaded into the collar 68. The holes 122 provide a clearance with respect to the bolts 120 so that the flexible diaphragm 54 can deflect until the plate 118 engages the bottom of one of the bolt heads. This is one possible stopping mechanism for the embodiment of the invention shown in FIGS. 3, 7, 8 and 9. Another possible stopping mechanism is shown in FIG. 11, 12 and 13 where, instead of a yoke 68, a circular plate 124 with slots 126 may be laterally connected to the motor shaft 26. Instead of the hub 58, shown in FIGS. 3, 7, 8 and 9, a plate 128 may be connected to the bottom of the rod 76 with hooks 130 which project into the slots 126. When this stopping mechanism is assembled, deflection of the flexible diaphragm 54 beyond a certain point will result in one of the hooks 130 engaging the bottom of the plate 124 and limiting the deflection angle. It should be noted that this latter stopping mechanism suggests that the hubs 58 and 62 could be switched with the yokes 64 and 68 respectively and still be within the spirit of the invention.

Figure 14:
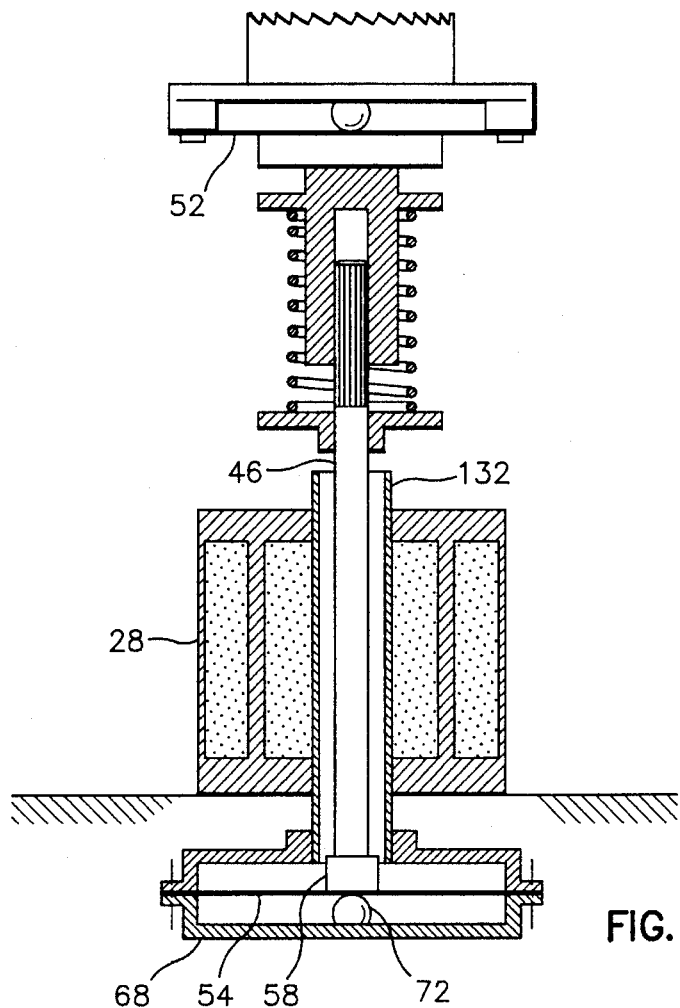
FIG. 14 is a schematic illustration of a modification of the invention where a hollow shaft of a motor is mounted about a drive shaft to minimize the length of the drive apparatus.

Still another modification of the invention is illustrated in FIG. 14 where the motor 28 is provided with a hollow shaft 132. The member 68 may be annular elements which contain the flexible diaphragm 54 and the ball portion 72, and may form a hub for connection to the bottom of hollow shaft 132. The drive shaft assembly 46 is connected to the flexible diaphragm 54 by the hub 58 and extends axially through the hollow motor shaft 132 for connection to the flexible diaphragm 52. This modification of the invention will result in a reduced height of the flexible drive shaft apparatus for operation in confined spaces. Further, when space is limited, there may not be enough room between the motor and the tape reel to have a suitable length for the intermediate axle 46 (in FIG. 3, for example). If the intermediate axle is very short, then for a given offset, the angle of deflection theta (in FIG. 6) is larger than for longer intermediate axles. As theta gets large, two bad effects occur: The tipping torque increases, and the diaphragm becomes less planar, reducing its torsional stiffness. Accordingly, the modification can also be used to provide a longer length between flexures to reduce angles of deflection.

Figure 17:
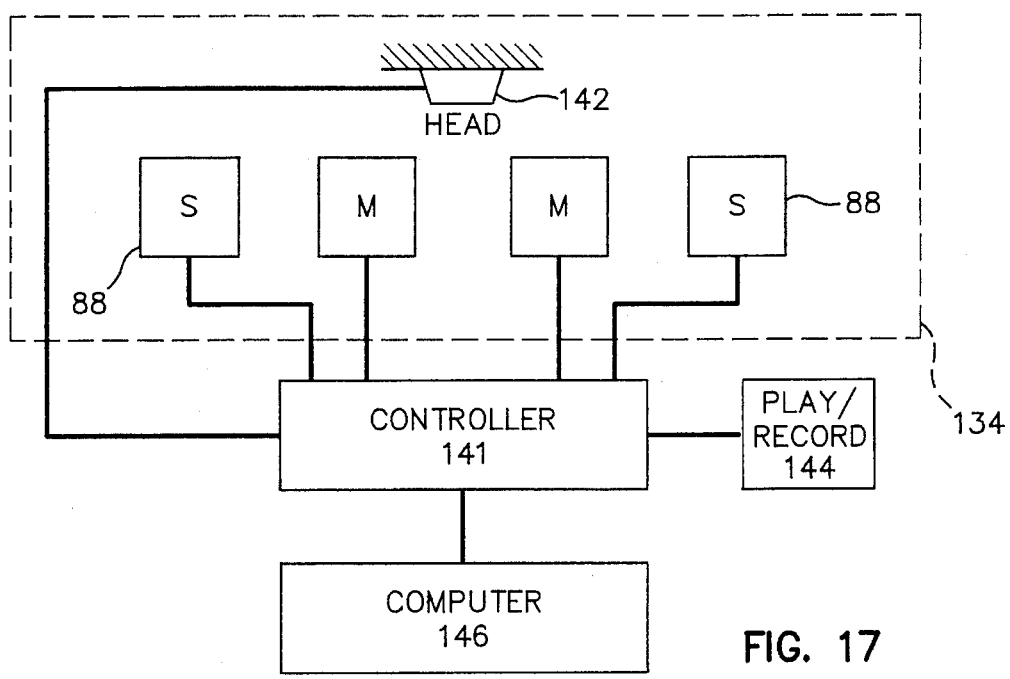
FIG. 17 is a block diagram of an exemplary system for operating a magnetic tape cassette for various play and/or record functions.

FIGS. 15, 16 and 17 illustrate the present invention being employed in a system for operating recordable media, such as a magnetic tape cassette. The system may perform a number of functions such as playing or recording on a magnetic tape, wind and rewind functions and retracting the flexible drive apparatus from the magnetic tape cassette. As shown in the figures, the system includes a tape drive, with a cabinet 134 shown with a top cut away 136. A conventional receiving mechanism 138 is mounted in the cabinet 134 for receiving a magnetic tape cassette 140. The cassette has the aforementioned spider gears 32 which are connected to the tape reels. The spider gears 24, which are connected to a pair of spaced apart flexible drive assemblies 40, engage the spider gears 32 to tape in the cassette 140 according to the teachings of the present invention. The motors 28 and the solenoids 88 may be fixed to the bottom of the cabinet, as shown in FIG. 15. The motors 28 are provided with on, off and variable speed modes. As shown in FIG. 17, a controller 141 is connected to the motors 28 for controlling these modes. Further, the controller may be connected to the solenoids 88 for controlling retraction of the flexible drive shaft spider gears 24 from the magnetic tape cassette spider gears 32. As shown in FIGS. 16 and 17 a read/write transducer head 142 is mounted within the cabinet 134 for conventional operation with respect to the magnetic tape of the cassette 140. The controller 141 may also be connected to this head 142 for operating play/record components 144.

If automation is desired an appropriately programmed computer 146 may be connected to the controller 140 for performing various drive operations.

It is readily apparent that the present invention is particularly useful for reliably driving magnetic tape cassettes when there is a misalignment between the tape cassette and the drive mechanism. It is to be understood however, that the invention could also be used for magnetic and optical disk drives as well as other articles, such as precision test or tool equipment, which need to be reliably rotated even though there is axial misalignment. The invention is especially capable of delivering high rotational torque with an accompanying very small angular torque due to deflection. This has been accomplished by components which are unique in and of themselves as well as by an overall unique combination of elements. The invention is especially adaptable for the embodiment shown in FIGS. 15, 16 and 17 where a reliable tape path is necessary. Further, the invention prevents wear of the components and the resulting debris which shortens the life of the system.

Although the invention has been described in terms of the specific embodiment, the inventors contemplate modifications and substitutions to various components of the invention would occur to the person of ordinary skill in the art and, therefor, would be in the scope of the invention, which is to be limited only by the claims which follow.

We claim:

1. A high torsional stiffness, low axial deflection stiffness flexible drive shaft apparatus for driving a recordable rotatable article by a power means for rotating the article comprising:

a laterally rigid drive shaft having opposite driving ends along an axis of rotation;

means for engaging said rotatable article;

a pair of flexible diaphragms, each diaphragm having oppositely facing substantially flat sides;

said pair of flexible diaphragms being spaced from one another along said axis of rotation with the flat sides substantially perpendicular to said axis of rotation;

the drive shaft and said opposite driving ends being located in the space between the pair of flexible diaphragms;

first means connected to a first driving end of the drive shaft and to a first one of the flexible diaphragms and further connectable to the power means for transmitting torsional force from the power means to the drive shaft via the first flexible diaphragm;

second means connected to a second driving end of the drive shaft, to a second one of the flexible diaphragms and to the article engaging means for transmitting torsional force from the drive shaft to the article engaging means via said second flexible diaphragm; and means operably connected to each respective torsional force transmitting means and movably engaging said opposite driving ends of said drive shaft for transmitting thrust loads exerted by the power means and the article engaging means on the drive shaft along all axes of rotation of the drive shaft;

whereby the flexible drive shaft apparatus can easily deflect under thrust loading to adapt for misalignment or axis offset between the drive apparatus and the rotatable article.

2. An apparatus as claimed in claim 1, further including:

means connected to the drive shaft intermediate its driving ends for telescoping the drive shaft along said axis of rotation.

3. An apparatus as claimed in claim 1, further including:

each flexible diaphragm being substantially circular with a central axis substantially aligned with the axis of rotation;

each flexible diaphragm having at least two pairs of arcuate apertures; and the apertures of one pair of arcuate apertures extending along an inner circle and the apertures of the other pair of arcuate apertures extending along an outer circle, the inner and outer circles and the flexible diaphragm being substantially concentric.

4. An apparatus as claimed in claim 3 including:

another drive shaft apparatus including another drive shaft, another means for engaging, another pair of flexible diaphragms, another first and second means for transmitting torsional force, and another means for transmitting thrust loads; and means connected to each drive shaft apparatus for fixedly positioning them in a laterally spaced relationship with their respective axis of rotation substantially parallel with respect to each other; and the means for engaging of each drive shaft apparatus including a gear.

5. An apparatus as claimed in claim 4 including:

means connected to each drive shaft intermediate its driving ends for telescoping the drive shaft along the axis of rotation of the drive shaft.

6. A high torsional stiffness low axial deflection stiffness flexible drive shaft apparatus for driving recordable media comprising:

drive shaft means having opposite ends for rotating on a first axis of rotation;

first and second flexible diaphragms, each diaphragm having oppositely facing substantially parallel flat sides;

said first and second flexible diaphragms being spaced from one another along said axis of rotation with the flat sides of the first flexible diaphragm being substantially parallel to the flat sides of the second flexible diaphragm;

the drive shaft means and said opposite ends being in the space located between the first and second flexible diaphragms;

means for connecting each diaphragm to a respective end of the drive shaft means with a flat side of each diaphragm extending in a respective plane, each of the respective planes being substantially perpendicular to the first axis of rotation;

a source of power having an output element which rotates on a second axis of rotation;

first means for connecting the output element of the power source to the first flexible diaphragm in a position generally opposite an end of the drive shaft means with the first and second axis of rotation substantially aligned such that torsional force can be transmitted from the output element to the drive shaft means via the first flexible diaphragm;

means for engaging the recordable media, the means for engaging having a third axis of rotation;

second means for connecting the means for engaging the recordable media to the second flexible diaphragm with the first and third axes of rotation substantially aligned such that torsional force can be transmitted from the drive shaft means to the means for engaging via the second flexible diaphragm; and means mounted between the first diaphragm and the first means for connecting and between the second diaphragm and the second means for connecting in order to transmit thrust loads along the first, second and third axes of rotation.

7. A flexible drive shaft apparatus as claims in claim 6 including:

each flexible diaphragm being substantially circular and having a central axis substantially aligned with the first axis of rotation;

each flexible diaphragm having at least two pairs of arcuate apertures; and the apertures of one pair of arcuate aperture, extending along an inner circle and the apertures of the other pair of arcuate apertures extending along an outer circle, the inner and outer circles and the flexible diaphragm being substantially concentric.

8. A flexible drive shaft apparatus as claimed in claim 7 including:

the flexible diaphragms each being stainless steel with a thickness between 0.002–0.010 inches.

9. A flexible drive shaft apparatus as claimed in claim 6 including:

the means for engaging the recordable media being a gear.

10. A flexible drive shaft apparatus as claimed in claim 6 including:

the drive shaft means including telescoping means for expanding or lengthening the distance between the opposite driving ends.

11. A flexible drive shaft apparatus as claimed in claim 10 including:

spring means connected to the telescoping means for urging the means for engaging the recordable media away from the source of power.

12. A flexible drive shaft apparatus as claimed in claim 11 including:

retracting means operably connected to the telescoping means for selectively overcoming the spring means and pushing the means for engaging the recordable media toward the source of power.

13. A flexible drive shaft apparatus as claimed in claim 6 including:

stop means for limiting angles of deflection between the flexible diaphragms and the drive shaft means.

14. A system for operating recordable media, the recordable media having drive receiving means for rotating the media comprising:

a system platform;

receptacle means in the platform for receiving the recordable media;

drive means mounted to the platform and engageable with the drive receiving means for rotating the recordable media;

the drive means including:

laterally rigid drive shaft means having opposite ends for rotation about a first axis of rotation;

a power source having an output element which is rotatable about a second axis of rotation;

means for engaging the drive receiving means of the recordable media, the engaging means being rotatable about a third axis of rotation;

a first flexible diaphragm and a second flexible diaphragm, each flexible diaphragm having oppositely facing substantially parallel flat sides;

said first and second flexible diaphragms being spaced from one another along said axis of rotation with their flat sides substantially perpendicular to said axis of rotation;

the drive shaft means and said opposite ends being located substantially entirely in the space between the first and second flexible diaphragms;

first means connected to the output element of the power source, the first flexible diaphragm and a first end of the drive shaft means for transmitting torsional force from the power source to the drive shaft means via the first flexible diaphragm, the first flexible diaphragm correcting misalignment between the first and second axes of rotation by deflecting in response to the torsional force;

second means connected to a second end of the drive shaft means, the second flexible diaphragm and the means for engaging the drive receiving means for transmitting torsional force from the drive shaft means to said means for engaging the drive receiving means via the second flexible diaphragm, the second flexible diaphragm correcting misalignment between the first and third axes of rotation by deflecting in response to the torsional force; and means operably connected to each of the first and second means for transmitting thrust loads exerted along the first, second and third axes so as to relieve axial stress on each flexible diaphragm.

15. A system as claimed in claim 14 including:

the power source having on, off and variable speed modes;

control means connected to said power source for controlling said modes; and computer means connected to the control means for enabling automatic operation of the recordable media means.

16. A system as claim in claim 14 including:

means connected to the drive shaft means for engaging and disengaging the engaging means with respect to the drive receiving means.

17. A system as claim in claim 14 including:

each flexible diaphragm being substantially circular with a central axis substantially aligned with the axis of the drive shaft means;

each flexible diaphragm having at least two pairs of arcuate apertures; and the apertures of one pair of arcuate apertures extending along an inner circle and the apertures of the other pair of arcuate apertures extending along an outer circle, the inner and outer circles and the flexible diaphragm being substantially concentric.

18. A high torsional stiffness low axial deflection stiffness flexible drive shaft apparatus for driving recordable media comprising:

drive shaft means having opposite ends for rotating on a first axis of rotation;

a pair of flexible diaphragms, each diaphragm having oppositely facing substantially parallel flat sides;

means for connecting each diaphragm to a respective end of the drive shaft means with one of said flat sides of each diaphragm extending in a respective plane, each of the respective planes being substantially perpendicular to the first axis of rotation;

a source of power having an output element which rotates on a second axis of rotation;

first means for connecting the output element of the power source to a first flexible diaphragm of said pair of flexible diaphragms in a position generally opposite an end of the drive shaft means with the first and second axis of rotation substantially aligned such that torsional force can be transmitted from the output element to the drive shaft means via the first flexible diaphragm;

means for engaging the recordable media, the means for engaging having a third axis of rotation;

second means for connecting the means for engaging to a second flexible diaphragm of said pair of flexible diaphragms with the first and third axes of rotation substantially aligned such that torsional force can be transmitted from the drive shaft means to the means for engaging via the second flexible diaphragm; and means mounted between the first diaphragm and the first means for connecting and between the second diaphragm and the second means for connecting for transmitting thrust loads extended along the first, second and third axes of rotation;

the source of power being a motor having a stator and an output element which is a hollow shaft; and the stator being mounted between the flexible diaphragms with the drive shaft means extending through the hollow shaft.

19. A flexible drive shaft apparatus as claimed in claim 18 including:

the means for transmitting thrust load being at least a portion of each of a pair of spherical balls, each spherical ball portion being fixed to a respective means for connecting; and the spherical portion of each ball portion rollably engaging a respective end of the drive shaft means.

20. A flexible drive shaft apparatus as claimed in claim 19 including:

each spherical ball portion engaging the respective end of the drive shaft means in a plane which is substantially coplanar with the flat sides of a respective one of said flexible diaphragms.

21. A high torsional stiffness low axial deflection stiffness flexible drive shaft apparatus for driving recordable media comprising:

drive shaft means having opposite ends for rotating on a first axis of rotation;

a pair of substantially circular flexible diaphragms, each diaphragm having a central axis which is substantially aligned with the first axis of rotation and having oppositely facing substantially parallel flat sides;

means including a hub for connecting each diaphragm to a respective end of the drive shaft means with one of said flat sides of each diaphragm extending in a respective plane, each of the respective planes being substantially perpendicular to the first axis of rotation;

a source of power having an output element which rotates on a second axis of rotation;

first means including a yoke for connecting the output element of the power source to a first flexible diaphragm of said pair of flexible diaphragms in a position generally opposite an end of the drive shaft means with the first and second axis of rotation substantially aligned such that torsional force can be transmitted from the output element to the drive shaft means via the first flexible diaphragm;

means for engaging the recordable media, the means for engaging having a third axis of rotation;

second means including a yoke for connecting the means for engaging to a second flexible diaphragm of said pair of flexible diaphragms with the first and third axes of rotation substantially aligned such that torsional force can be transmitted from the drive shaft means to the means for engaging via the second flexible diaphragm;

each hub being connected to an inner portion of a respective flexible diaphragm and each yoke being connected to an outer portion of a respective flexible diaphragm;

each flexible diaphragm having an annular portion between its inner and outer connected portions;

means mounted between the first diaphragm and the first means for connecting and between the second diaphragm and the second means for connecting in order to transmit thrust loads extending along the first, second and third axes of rotation;

each means for transmitting thrust loads being at least a portion of a spherical ball, each spherical ball portion being fixed to a respective yoke;

each hub being fixed to the drive shaft means for forming a respective end thereof; and the spherical portion of each ball portion slidably engaging a respective one of said hubs in a plane which is substantially coplanar with the flat sides of a respective one of said flexible diaphragms.

22. A flexible drive shaft apparatus as claimed in claim 21 including:

the drive shaft means including telescoping means for expanding or lengthening the distance between the opposite ends.

23. A flexible drive shaft apparatus as claimed in claim 22 including:

the source of power being a motor having a stator and said output element which is a hollow shaft; and the stator being mounted between the flexible diaphragms with the drive shaft means extending through the hollow shaft.

24. A flexible drive shaft apparatus as claimed in claim 23 including:

respective stop means interconnected between each hub and yoke for limiting the angles of deflection between the flexible diaphragms and the drive shaft means.

25. A flexible drive shaft apparatus as claimed in claim 24 including:

the means for engaging the recordable media being a gear.

26. A flexible drive shaft apparatus as claimed in claim 25 including:

means connected to the telescoping means for selectively extending and retracting the means for engaging the recordable media.

27. A flexible drive shaft apparatus as claimed in claim 26 including:

the flexible diaphragms each being stainless steel with a thickness between 0.002–0.080 inches.

28. A high torsional stiffness low axial deflection stiffness flexible drive shaft apparatus for driving recordable media comprising:

drive shaft means having opposite ends for rotating on a first axis of rotation;

a pair of flexible diaphragms, each diaphragm having oppositely facing substantially parallel flat sides;

means for connecting each diaphragm to a respective end of the drive shaft means with one of flat sides of each diaphragm extending in a respective plane, each of the respective planes being substantially perpendicular to the first axis of rotation;

each means for connecting including a hub which has opposite facing flat surfaces, each hub being connected to an inner portion of a respective one of said flexible diaphragms, with a respective one of said flat surfaces of each hub directly engaging the respective flexible diaphragm;

a source of power having an output element which rotates on a second axis of rotation;

first means for connecting the output element of the power source to a first flexible diaphragm of said pair of flexible diaphragms in a position generally opposite an end of the drive shaft means with the first and second axis of rotation substantially aligned such that torsional force can be transmitted from the output element to the drive shaft means via the first flexible diaphragm, said first means including a yoke which is connected to an outer portion of the first flexible diaphragm;

means for engaging the recordable media, the means for engaging having a third axis of rotation;

second means for connecting the means for engaging to a second flexible diaphragm of said pair of flexible diaphragms with the first and third axes of rotation substantially aligned such that torsional force can be transmitted from the drive shaft means to the means for engaging via the second flexible diaphragm, said second means including a yoke which is connected to an outer portion of the second flexible diaphragm; and means mounted between the first diaphragm and the first means for connecting and between the second diaphragm and the second means for connecting in order to transmit thrust loads extended along the first, second and third axes of rotation.

29. A flexible drive shaft apparatus as claimed in claim 28 including:

each flexible diaphragm being substantially circular with a central axis substantially aligned with the first axis of rotation;

each flexible diaphragm having an annular portion between said inner and outer connected portions;

the annular portion of each flexible diaphragm having at least two pairs of arcuate apertures; and the apertures of one pair of arcuate apertures extending along an inner circle of each flexible diaphragm and the apertures of the other pair of arcuate apertures extending along an outer circle, of each flexible diaphragm the inner and outer circles and each flexible diaphragm being substantially concentric.

30. A high torsional stiffness low axial deflection stiffness flexible drive shaft apparatus for driving recordable media comprising:

at least one flexible diaphragm for transmitting torsional loads, the diaphragm having a central aperture;

first and second driving elements for transmitting axial and torsional loads;

the first driving element being connected to an inner portion of the diaphragm and the second driving element being connected to an outer portion of the diaphragm;

axial load transmitting means engaging the first and second driving elements for transmitting axial loads therebetween; and the axial load transmitting means engaging the first driving element through the central aperture of the diaphragm and including at least a portion of a spherical ball which is fixedly connected to one of the driving elements and slidably engages the other driving element.

31. A drive shaft as claimed in claim 30 including:

the diaphragm having a generally flat surface which lies in a plane;

the ball having a spherical surface which slidably engages said other driving element; and the location of engagement of the spherical surface of the ball with said other driving element lying generally in said plane of the diaphragm.

32. A drive shaft as claimed in claim 31 including:

the diaphragm being stainless steel with a thickness from 0.003–0.005 inches.

33. A high torsional stiffness, low axial deflection stiffness flexible drive shaft apparatus for driving recordable media comprising:

a middle shaft located between top and bottom shafts, the shafts being in axial alignment with respect to one another along a common axis;

a top diaphragm being located between a top end of the middle shaft and a bottom end of the top shaft, and a bottom diaphragm located between a top end of the bottom shaft and a bottom end of the middle shaft, each diaphragm having top and bottom planar surfaces which extend perpendicular to said common axis;

a top hub and yoke assembly connecting the top end of the middle shaft to the bottom end of the top shaft via the top diaphragm and a bottom hub and yoke assembly connecting the bottom end of the middle shaft to the top end of the bottom shaft via the bottom diaphragm so that torsional loads can be transmitted between the shafts;

a top element mounted on one of the top end of the middle shaft and the bottom end of the top shaft and having a rounded portion which bears on the other of the top end of the middle shaft and the bottom end of the top shaft for transmitting axial loads between the middle and top shafts; and a bottom element mounted on one of the bottom end of the middle shaft and the top end of the bottom shaft and having a rounded portion which bears on the other of the bottom end of the middle shaft and the top end of the bottom shaft for transmitting axial loads between the middle and bottom shafts.

34. A magnetic tape reel drive including a pair of flexible drive shaft apparatuses, each flexible drive shaft apparatus of the pair being a flexible drive shaft apparatus as claimed in claim 33, the tape reel drive comprising:

a platform;

a pair of receptacles mounted on the platform for receiving a pair of tape reels;

a magnetic head mounted on the platform for a transducing relationship with tape between the pair of tape reels;

reel engaging means at the top ends of the top shafts for engaging said tape reels through the receptacles;

motors connected to bottom ends of the bottom shafts for rotating the reel engaging means via the shafts;

control means connected to the motors and the magnetic head for controlling operation of the motors; and computer means connected to the control means for selective operation of the control means.

35. A drive shaft apparatus as claimed in claim 33 wherein the rounded portion of each element bears on a central portion of an end of a respective shaft when a respective one of said diaphragms is in an unflexed planar condition.

36. A drive shaft apparatus as claimed in claim 33 wherein each element is a spherical ball.

37. A drive shaft apparatus as claimed in claim 33 wherein the rounded portion of each element is at least a portion of a spherical ball.

38. A drive shaft apparatus as claimed in claim 37 wherein the rounded portion of each element bears on a central portion of an end of a respective shaft when a respective one of said diaphragms is in an unflexed planar condition.

39. A drive shaft apparatus as claimed in claim 33 wherein the rounded portion of each of the top and bottom elements bears on an end of a respective shaft at a location between and inclusive of the top and bottom planes of a respective one of said diaphragms.

40. A drive shaft apparatus as claimed in claim 39 wherein the rounded portion of each element is at least a portion of a spherical ball.

41. A drive shaft apparatus as claimed in claim 40 wherein said at least a spherical ball portion of each element bears on an end of a respective shaft when a respective diaphragm is in an unflexed planar condition and rollably bears on the respective end of the shaft when the respective diaphragm has been forced to a flexed nonplanar condition by misalignment of said respective shafts.

42. A drive shaft apparatus as claimed in claim 41 wherein each diaphragm is stainless steel with a thickness in the range of 0.002 to 0.010 inches.

43. A drive shaft apparatus as claimed in claim 42 wherein each of the hub and yoke assemblies includes means for stopping misalignment of respective shafts after a predetermined deflection of a respective one of said diaphragms from its nondeflected planar condition.

44. A drive shaft apparatus as claimed in claim 43 including:

the top end of the top shaft having article engaging means;

the middle shaft includes first and second shafts with the first shaft telescoping inside the second shaft; and a spring urging the first shaft away from the second shaft for urging the article means toward an article.

45. A drive shaft apparatus as claimed in claim 44 including:

means engaging the first shaft of the middle shaft for retracting the first shaft into the second shaft against spring force so that the article engaging means can be retracted from the article.

46. A magnetic tape reel drive including a pair of flexible drive shaft apparatuses, each flexible drive shaft apparatus of the pair being a flexible drive shaft apparatus as claimed in claim 45, the tape reel drive comprising:

a platform;

a pair of receptacles mounted on the platform for receiving a pair of tape reels;

a magnetic head mounted on the platform for a transducing relationship with tape between the pair of tape reels;

the article engaging means being tape reel engaging means at the top ends of the top drive shafts for engaging the tape reels through the receptacles;

motors connected to bottom ends of the bottom shafts for rotating the reel engaging means via the bottom shafts;

control means connected to the motors and the magnetic head for controlling operation of the motors; and computer means connected to the control means for selective operation of the control means.

47. A drive shaft apparatus as claimed in claim 46 wherein each diaphragm has only two pairs of arcuate apertures, each pair of arcuate apertures being symmetrically arranged on the diaphragm with symmetrical axes of the pairs of arcuate apertures being perpendicular to one another.

* * * * *

UNITED STATES PATENT AND TRADEMARK OFFICE
CERTIFICATE OF CORRECTION

PATENT NO. : 5,490,020
DATED : February 6, 1996
INVENTOR(S) : Albrecht et al.

It is certified that error appears in the above-indentified patent and that said Letters Patent is hereby corrected as shown below:

Column 14, line 64, between "of" and "flat" insert --said--;

Column 15, line 46, after "circle" delete "," and after "diaphragm" insert --,--.

Signed and Sealed this

Twenty-fifth Day of February, 1997

Attest:

BRUCE LEHMAN

*Attesting Officer*  *Commissioner of Patents and Trademarks*